United States Patent
Peters et al.

(10) Patent No.: US 6,470,289 B1
(45) Date of Patent: Oct. 22, 2002

(54) INDEPENDENTLY CONTROLLING PASSIVE AND ACTIVE COOLING IN A COMPUTER SYSTEM

(75) Inventors: Mark W. Peters, Houston; Richard H. Hodge, The Woodlands, both of TX (US)

(73) Assignee: Compaq Information Technologies Group, L.P., Houston, TX (US)

(*) Notice: Subject to any disclaimer, the term of this patent is extended or adjusted under 35 U.S.C. 154(b) by 0 days.

(21) Appl. No.: 09/368,950

(22) Filed: Aug. 5, 1999

(51) Int. Cl.[7] ............................................. G01K 3/08
(52) U.S. Cl. ............................................. 702/132; 374/10
(58) Field of Search .............................. 702/130, 131, 702/132, 133, 99; 374/10, 11, 100, 103, 112, 113, 114, 120, 145, 163; 361/158; 713/300

(56) References Cited

U.S. PATENT DOCUMENTS

| | | | | |
|---|---|---|---|---|
| 5,566,377 A | * | 10/1996 | Lee | 165/80.3 |
| 5,731,954 A | * | 3/1998 | Cheon | 165/104.33 |
| 5,805,403 A | * | 9/1998 | Chelma | 337/302 |
| 6,134,667 A | * | 10/2000 | Suzuki et al. | 318/302 |
| 6,172,611 B1 | * | 1/2001 | Hussain et al. | 340/584 |
| 6,204,623 B1 | * | 3/2001 | Levy et al. | 318/641 |
| 6,243,656 B1 | * | 6/2001 | Arai et al. | 702/132 |
| 6,321,175 B1 | * | 11/2001 | Nagaraj | 257/467 |

OTHER PUBLICATIONS

*Mobile Pentium® II Processor and Pentium II Processor Mobile Module Thermal Sensor Interface Specifications*, Intel® Corporation, AP–825, Application Note, Apr. 1998, Order Number: 243724–001.

(List continued on next page.)

*Primary Examiner*—Marc S. Hoff
*Assistant Examiner*—Edward Raymond
(74) *Attorney, Agent, or Firm*—Conley, Rose & Tayon, P.C.; Michael F. Heim; Jonathan M. Harris

(57) ABSTRACT

A computer system having thermal control logic that efficiently cools the computer system. In accordance with one embodiment of the invention, the thermal control logic couples to a CPU module and a fan. The CPU module includes a pair of temperature response elements. One temperature response element located near or on the CPU core logic or die on which the CPU is fabricated. The other temperature response element is located near or on an exterior surface of the CPU module. The thermal control logic monitors the temperature of recorded by each temperature response element and controls the speed of the fan and the frequency of the CPU core clock independently. Preferably, the thermal control logic adjusts the fan speed as a function of the temperature recorded by the temperature element adjacent an exterior surface of the CPU module. The thermal control logic also adjusts the frequency of the CPU clock signal as a function of the temperature recorded by the temperature response element adjacent the CPU core. By disassociating control of the fan speed from the temperature of the CPU core, the annoyance in conventional computer systems caused fans that rapidly turn on and off or change speed rapidly is reduced.

39 Claims, 4 Drawing Sheets

OTHER PUBLICATIONS

*System Management Bus Specification*, Smart Battery System Specifications, Revision 1.1, Dec. 11, 1998, Copyright© 1996, 1997,1998, Benchmarq Microelectronics Inc., Duracell Inc., Energizer Power Systems, Intel Corporation, Linear Technology Corporation, Maxim Integrated Products, Mitsubishi Electric Corporation, National Semiconductor Corporation, Toshiba Battery Co., Varta Batterie AG.

*Mobile Pentium® II Processor In Mini–Cartridge Package At 366 MHZ, 300 PE MHZ, and 266 PE MHZ*, Intel® Corporation, Order Number: 245108–001.

*Computer Fan Speed System To Reduce Audible Perceptibility Of Fan Speed Changes*, Charles J. Stancil et al., U.S. Patent Application Ser. No. 09/443,575, filed Nov. 19, 1999 (23 p.).

*Adaptive Fan Controller For A Computer System*, Gregory P. Ziarnik, U.S. Patent Application Ser. No. 10/036,273, filed Dec. 26, 2001 (24 p.).

*Low Cost PC Temperature Monitor And Fan Control ASIC, Analog Devices, Preliminary Technical Data, ADM1022*, Rev. PrJ Mar. 1999 (20 pp.).

* cited by examiner

FIG. 4

| | LOW TEMP. | HIGH TEMP. | FAN SPEED | |
|---|---|---|---|---|
| 201 → | 0° C | 5° C | 0 | ← 206 |
| 201 → | 60 | 70 | 8 | |
| 201 → | 66 | 80 | C | |
| 201 → | 76 | 100 | F | |

| | LOW TEMP. | HIGH TEMP. | CPU SPEED | |
|---|---|---|---|---|
| 211 → | 0° C | 90° C | 100% | ← 216 |
| 211 → | 80 | 95 | 75 | |
| 211 → | 80 | 99 | 50 | |
| 211 → | 96 | 110 | STDBY | |

| LOW TEMP. | HIGH TEMP. | CPU SPEED |
|---|---|---|
| 0° C | 65° C | 100% |
| 55 | 75 | 75 |
| 66 | 99 | 50 |
| 96 | 110 | STDBY |

217

INDEPENDENTLY CONTROLLING PASSIVE AND ACTIVE COOLING IN A COMPUTER SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to cooling a computer system. More particularly, the present invention relates to passively and actively cooling a computer system. Still more particularly, the invention relates to independently controlling passive and active cooling in a portable computer in response to processor temperature.

2. Background of the Invention

Computer systems include numerous electrical components that draw electrical current to perform their intended functions. A computer's microprocessor or central processing unit ("CPU") requires electrical current to perform many functions such as controlling the overall operations of the computer system and performing various numerical calculations. Any electrical device through which electrical current flows produces heat. The amount of heat any one device generates generally is a function of the amount of current flowing through the device.

Typically, each manufacturer designs its products to operate correctly within a predetermined temperature range. If the temperature exceeds the predetermined range (i.e., the device becomes too hot or too cold), the device may not function correctly thereby potentially degrading the overall performance of the computer system. Thus, it is desirable for a computer system generally and its components specifically to operate within a thermally benign environment.

Some computers implement two techniques for cooling the computer's internal electrical components. One technique, referred to as "active" cooling, uses a fan to blow warm air surrounding one or more "hot" components through a vent and outside the computer. Thus, active cooling removes the warm air from a computer.

The second cooling technique, called "passive" cooling, slows down the operating speed of a component so that the component will produce less heat. This concept is analogous to a human that travels by foot a given distance. Running the distance at fall speed causes the person to become hotter than merely walking the same distance at a slow pace. To filly appreciate active cooling in a computer, consider that many electrical components, such as integrated circuits ("ICs") operate using a "clock" signal. A clock signal is a voltage that changes rapidly between a high voltage level (e.g., 3.3 volts) and a low voltage level (e.g., 0 volts) at a predetermined rate. Each transition is called an "edge." The transition of the voltage from low to high and back to low again is called a "cycle" and the number of cycles per second is called "frequency" which is measured in units of Hertz ("Hz"). For example, a 400 megahertz (MHz) clock signal oscillates at a rate of 400 million cycles per second. Because each cycle includes two voltage transitions (one from low to high and the other from high back to low), a 400 MHz clock signal changes voltage state 800 million times per second.

Most IC's used in computer systems include transistors. CPUs include thousands or hundreds of thousands of transistor in a single package. Each transistor generally acts as a switch and operates in one of two states-conducting and not conducting. Most computer-related ICs are made from a type of semiconductor technology called Complementary Metal Oxide Semiconductor ("CMOS"). Most of the electrical current flowing through transistors, such as CMOS transistors, flows while the transistor changes states from conducting to non-conducting or vice versa. While the transistor is in a particular state, such as conducting or non-conducting, little, if any, current flows through the device.

The transistors in a computer IC change state synchronously with a clock signal. Thus, the transistors in a 400 MHz CPU (i.e. a CPU operating from a 400 MHz clock signal), change state 800 million times per second. Of course, not every transistor in the CPU changes state on every edge of every cycle of the clock signal; some or many transistors may remain in a given state for multiple clock signals. Nevertheless, because current flows through the transistors, which may number in the hundreds of thousands or millions in a typical CPU, on the edges of the clock signal, current flows in spurts 800 millions times per second for a 400 MHz CPU. As the operating speeds of CPUs have increased (i.e., higher frequency clock signals), and likely will continue to increase, the current flowing the CPU has and will continue to increase, all else being equal. Accordingly, heat generated by current flowing in a CPU has become a problem. CPU designers strive to reduce the operating current requirement of their CPUs, but additional measures usually are desirable to reduce the heat generated by the CPU.

The passive cooling technique includes reducing the clock frequency of the CPU. Instead of operating at 400 MHz, the CPU clock will be reduced to lower frequency, such as 300 MHz. With fewer transistor state changes occurring per second, less current flows through the CPU each second and thus, less heat it is generated by the device.

Although the principles of the present invention explained below apply to cooling either a desktop or portable (laptop) computer, the benefit is more pronounced with regard to laptop computers. Laptops operate either from power supplied from a wall socket, alternating current ("AC") power, or from a battery, direct current ("DC") power. Typically, the battery is a rechargeable battery that, with a full charge, can power the computer for several hours depending on operating conditions. Because a battery's charge only operates the computer for a relatively short period of time, it is highly desirable to design laptops to consume as little power as possible.

In contrast to desktop computers, the fans in laptops often can be controlled by the computer's internal logic thereby permitting the lap top computer to turn off the fan during periods of time in which the fan is not needed to actively cool the computer. Some laptops, in fact, include a temperature sensor to permit monitoring the temperature inside the computer. Further, a temperature sensor is incorporated into some CPUs, such as the Mobile Pentium® II CPU by Intel® to permit monitoring of the internal temperature of the CPU. Monitoring the internal temperature of the CPU generally is regarded as beneficial because the CPU is a major contributor to the total heat generated by a computer's electronics.

Conventional laptop computers typically monitor the computer's temperature and turn the fan on or off while concurrently adjusting the CPU clock speed. Many conventional laptops monitor the CPU internal temperature and set the state of the fan (i.e., on or off) and at the same time adjust the clock frequency. While generally sufficient to maintain the computer operating in a benign thermal environment, this technique in which the passive and active cooling states are controlled together dependent upon a single temperature reading suffers from at least one problem as explained below.

The problem is most pronounced in laptops which, as noted above, have a limited battery operating life. To conserve battery life, laptops often keep the fan off as much as possible to conserve battery power. That is, whenever not needed for cooling, the computer turns off the fan and when needed, the computer turns on the fan. Of course, the computer also adjusts the CPU clock frequency as it adjusts the fan. The internal temperature of a CPU can vary rapidly as its clock frequency changes. In computers that monitor internal CPU core temperature and that turn the fan on and off and simultaneously adjust CPU clock frequency in response to CPU core temperature, the fan will be turned on and off at an annoying rapid rate because the CPU core temperature can vary rapidly. The annoyance is to the user who can hear the fan turn on and off. On the other hand, if the computer monitors the temperature away from the CPU core, such as on an exterior surface of the CPU package, to avoid the cycling of the fan on and off so rapidly, the computer may unnecessarily slow down the CPU clock to correct a thermal problem that is unrelated to the CPU core.

An additional problem with laptops that control the fan and CPU clock frequency together in response to CPU internal temperature is that air blowing over a CPU generally does not effectively cool a CPU that becomes excessively warm because of internal transistor state changes. In other words, a CPU that becomes hot due to heat generated by its internal core logic is not cooled nearly as well by active cooling from a fan, but rather is cooled much more efficiently by passively adjusting the CPU clock frequency. Thus, often excessive battery power is used to run a fan that has little effect on correcting a thermal problem created by the CPU core.

Accordingly, it is desirable to provide a computer with a thermal control system that solves these problems. Such a computer will reduce or minimize the annoyance caused by a fan turning on and off often in a relatively short period of time. Further, such a computer will have a thermal control mechanism that will effectively maintain the computer sufficiently cool using less power than previously required.

BRIEF SUMMARY OF THE INVENTION

The problems noted above are solved in large part by a computer system having thermal control logic that efficiently cools the computer system. In accordance with one embodiment of the invention, the thermal control logic couples to a CPU module and a fan. The CPU module includes a pair of temperature response elements. One temperature response element located near or on the CPU core logic or die on which the CPU is fabricated. The other temperature response element is located near or on an exterior surface of the CPU module. The thermal control logic monitors the temperature of recorded by each temperature response element and controls the speed of the fan and the frequency of the CPU core clock independently. Preferably, the thermal control logic adjusts the fan speed as a function of the temperature recorded by the temperature element adjacent an exterior surface of the CPU module. The thermal control logic also adjusts the frequency of the CPU clock signal as a function of the temperature recorded by the temperature response element adjacent the CPU core. By disassociating control of the fan speed from the temperature of the CPU core, the annoyance in conventional computer systems caused fans that rapidly turn on and off or change speed rapidly is reduced.

The thermal control logic may be implemented using a keyboard controller that connects to the CPU via a bus, such as a System Management Bus ("SMBus"). The CPU includes a temperature sensor that includes the temperature response element located near an exterior surface of the CPU. The other temperature response element is located near the CPU core and connects to the temperature sensor. The temperature sensor includes a pair of registers for storing the temperature values associated with each of the temperature response elements. The keyboard controller polls the CPU for the temperature values recorded by the two temperature response elements. When one of the current temperatures exceeds a predetermined threshold, the keyboard controller generates a system management interrupt (SMI) signal. The CPU core responds to the interrupt by determining which of the temperature response elements triggered the SMI. A pair of control tables preferably stored in main memory coupled to the CPU specify whether the CPU clock frequency should be adjusted in response to the thermal event or whether the fan speed should be adjusted. The CPU core compares the current temperature recorded by the temperature response element that detected the thermal event to the control tables and adjusts either the fan speed or the CPU clock frequency accordingly.

These and other benefits and features will become apparent once the following description is reviewed.

BRIEF DESCRIPTION OF THE DRAWINGS

For a detailed description of the preferred embodiments of the invention, reference will now be made to the accompanying drawings in which:

FIG. 3 shows a communication protocol for requesting the current temperature values of the CPU shown in FIG. 2;

FIG. 4 shows a preferred temperature control table for controlling fan speed dependent on the temperature of a region away from the CPU core;

FIG. 5 shows a preferred temperature control table for setting CPU throttling dependent on CPU core temperature;

FIG. 6 shows an alternative temperature control table to that of FIG. 5 that forces the computer system to adjust CPU clock throttling before adjusting fan speed.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising"

are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

The terms central processing unit ("CPU") and "CPU core logic" are used in the following disclosure. Unless otherwise indicated, "CPU" is intended to refer to an electrical monolithic package that includes the CPU core logic and other components as desired, such as the temperature described below or cache memory. The CPU core logic generally includes most or all of the key logic to control the computer system.

DETAILED DESCRIPTION OF THE PREFERRED EMBODIMENTS

Figure 1:
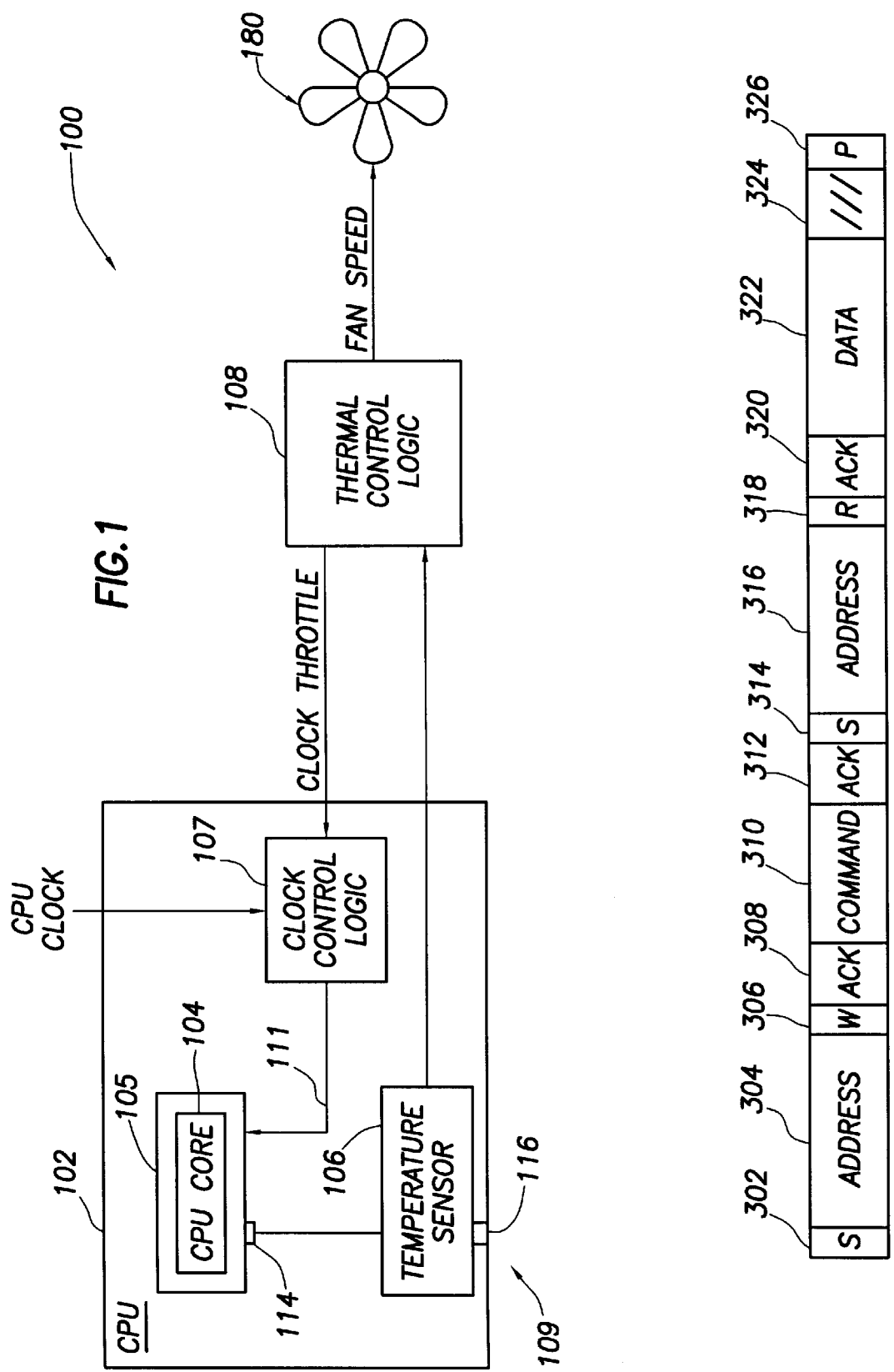
FIG. 1 shows a block diagram of a computer system including thermal control logic in accordance with the preferred embodiment.

Referring now to FIG. 1, in accordance with the preferred embodiment, computer system 100 includes a central processing unit ("CPU"), thermal control logic 108 and a fan 180. The computer system 100 may include many other components not shown in FIG. 1, but those components having particular relevance to cooling the computer in accordance with the preferred embodiment are shown. The CPU 102 preferably includes CPU core logic 104 fabricated on a semiconductor die 105 in accordance with standard manufacturing techniques. The CPU 102 also includes a temperature sensor 106 and clock control logic 107. The CPU 102 may include other components as desired.

In accordance with the preferred embodiment, the temperature sensor 106 is capable of measuring or otherwise determining the temperature of the die 105 and a region away from the die 105, such as an exterior region 109 of the CPU 102. Thus, the temperature sensor 106 senses temperature at two locations, or more if desired. As shown conceptually in FIG. 1, the temperature sensor 106 senses the temperature of the CPU die 105 using a temperature response element 114, preferably a thermally sensitive silicon diode, thermally coupled to the CPU core 104 or die 105. The temperature response element 114 thus is mounted adjacent to, in, on or near the die 105 to detect the temperature of the CPU core 104 or die 105. The location of temperature response element 114 is such that the temperature of the CPU core 104 is detected. The temperature sensor 106 drives a small current through the diode 114 and measures the voltage generated across the diode by the current. The resulting voltage, in part, is a function of the temperature of the diode and thus, using the voltage the temperature sensor 106 computes the temperature of the CPU die 105.

The CPU 102 includes another temperature response element 116 (e.g., also thermally sensitive a silicon diode) which preferably is contained within the temperature sensor 106. Further, the temperature sensor 106 preferably is mounted on or near an exterior surface of the CPU 102 and thus the silicon diode 116 contained therein provides an indication of the temperature of an exterior region of the CPU package 102. The temperature sensor 106 receives signals from sensors 114, 116 and computes and stores temperature values in internal registers (shown in FIG. 2).

For the purpose of this disclosure, the temperature of the CPU die 105, measured using silicon diode 114, is referred to as the "CPU core temperature" or "die temperature." The temperature of the exterior CPU 102 region is referred to as the "external temperature" or "temperature sensor temperature." Generally, "external temperature" is intended to include a temperature reading of an area separate from the CPU core and preferably near or at an exterior region of the CPU. Although thermal sensor 116 is included as part of the CPU package 102, the sensor 116 could be located apart from, but connected to, CPU 102. For example, sensor 116 could be located anywhere on the computer's system board (not shown) and thus "external temperature" can refer to the temperature of a region of computer system 100 that is influenced very little, if any, by heat generated by the CPU core 104.

CPU 102 can be any suitable processor that includes a temperature sensor capable of measuring or determining temperature at two or more locations in, on or near the CPU. Examples of suitable CPUs include various package styles of the Mobile Pentium® II Processor such as the Mini-Cartridge, MMC1 and MMC2 packages. The CPU die 105, clock control logic 107, temperature response elements 114, 116, and temperature sensor 106 preferably are included in a single integrated or monolithic package fabricated according to known techniques.

The clock control logic 107 receives an input CPU CLOCK signal and uses that input CPU CLOCK signal to generate another clock signal 111 used to operate the CPU core 104. The frequency of the clock signal provided to the CPU core 104 may be the same or different from the frequency of the input clock signal. Further, clock control logic 107 may use the input CPU CLOCK signal to generate and provide multiple clock signals to the CPU core 104.

Referring still to FIG. 1, the thermal control logic 108 reads the CPU's temperatures from the temperature sensor 106 and, if necessary, adjusts the thermal control of the computer system 100. In accordance with the preferred embodiment, the thermal control logic 108 independently controls the CPU core clock frequency and the speed of fan 180 in response to one or both of the temperature readings provided by the temperature sensor 106. By "independently" it is meant that the thermal control logic 108 can adjust CPU clock frequency, referred to as CPU "throttling," without adjusting the fan speed and vice versa and that the control of CPU throttling is based on a different temperature response element than that which controls fan speed. Preferably, the level of CPU throttling is determined based on CPU core temperature and fan speed is determined based on external temperature. If desired, however, thermal control logic 108 can throttle up or down (i.e., increase or decrease the frequency of the clock signal provided to the CPU core 104), while concurrently or simultaneously adjusting the speed of fan 180 via a fan speed signal.

Preferably, the thermal control logic 108 adjusts the CPU throttling as the temperature sensor 106 indicates that the CPU die temperature, detected by silicon diode 114, has exceeded a predetermined range. Accordingly, if the thermal control logic 108 determines that the temperature of CPU die 105 has increased beyond a predetermined upper threshold, the thermal control logic throttles down the CPU core 104 (i.e., decreases its clock frequency to cause the core to generate less heat). Conversely, as the CPU core temperature decreases below another predetermined lower threshold, the thermal control logic 108 throttles up the CPU core 105 (i.e., increases its clock frequency to permit the core to operate faster). Changes to the CPU core clock frequency are made via the CLOCK CONTROL signal which is asserted by thermal control logic 108 to the clock control logic 107. The clock control logic 107 generates and provides the clock signal 111 to the CPU core 104 in accordance with the desired clock frequency indicated by the CLOCK CONTROL signal. Thus, the thermal control logic 108 throttles up or down the CPU core 104 in response to the temperature of the CPU core 104 as detected by silicon diode 114 located in close proximity to CPU die 105.

In addition, the thermal control logic 108 can adjust independently the speed of the fan 180. Increases in fan speed results in a greater volume of air moving through the computer system 100 and thus greater cooling effect than with a slower fan speed. A slower fan speed moves less air and thus has less of a cooling effect.

In general, heat generated by the CPU core 104 propagates outward through the CPU package. Thus, to some extent, the temperature sensor temperature detected by the temperature sensor silicon diode 116 is effected by the temperature of the CPU core 104. However, blowing air across the CPU 102 generally has less of a cooling effect on the CPU core 104 than throttling down the CPU core. That is, cooling the external regions of the CPU 102 may keep the external CPU area cool, but does not cool the source of the heat generation, the CPU core 104. This means that a CPU core 104 that has become excessively warm or hot is best cooled by throttling down the CPU core. Blowing air across the CPU 102 has some, but less, effect on cooling a CPU core 104.

On the other hand, the exterior region 109 of the CPU 102 may become excessively warm from heat generated by another device in the computer system. Although not shown in FIG. 1, an interface card such as a peripheral component interconnect ("PCI") card or PCMCIA card may become hot from use and its heat radiates to the CPU 102, which in turn becomes warm. In this situation, the temperature sensor temperature of the exterior region 109 of the CPU 102 may increase, but not the CPU die 105 temperature. This situation can best be corrected by blowing a sufficient volume of air across the CPU 102. Throttling down the CPU core 104 has less of an effect in cooling a CPU 102 that has become excessively warm from a separate device in the computer system.

Thus, in accordance with the preferred embodiment, thermal control logic 108 monitors both the CPU die temperature via silicon diode 114 and the temperature sensor temperature via silicon diode 116 and independently adjusts the CPU core 104 throttling and fan speed depending on the which temperature has become excessive. If the CPU die temperature becomes excessively warm, the thermal control logic 108 responds by throttling down the CPU core 104, while preferably not adjusting the speed of fan 180. As the CPU die temperature then decreases below a threshold as a result of a slower clock signal, the thermal control logic 108 can throttle up the CPU core to increase performance of the computer system. If, however, the temperature sensor temperature becomes excessively warm, the thermal control logic 108 preferably responds by increasing fan speed, while preferably not adjusting the throttling of the CPU core 104. Once the temperature sensor temperature reduces below a threshold as a result of increased air flow over the CPU 102, the thermal control logic 108 preferably reduces the fan speed.

By independently controlling CPU throttling and fan speed, adjustments to fan speed are not effected much by relatively rapid fluctuations in CPU die temperature. Accordingly, the annoyance of a fan that rapidly turns on and off and adjusts its speed is lessened.

Figure 2:
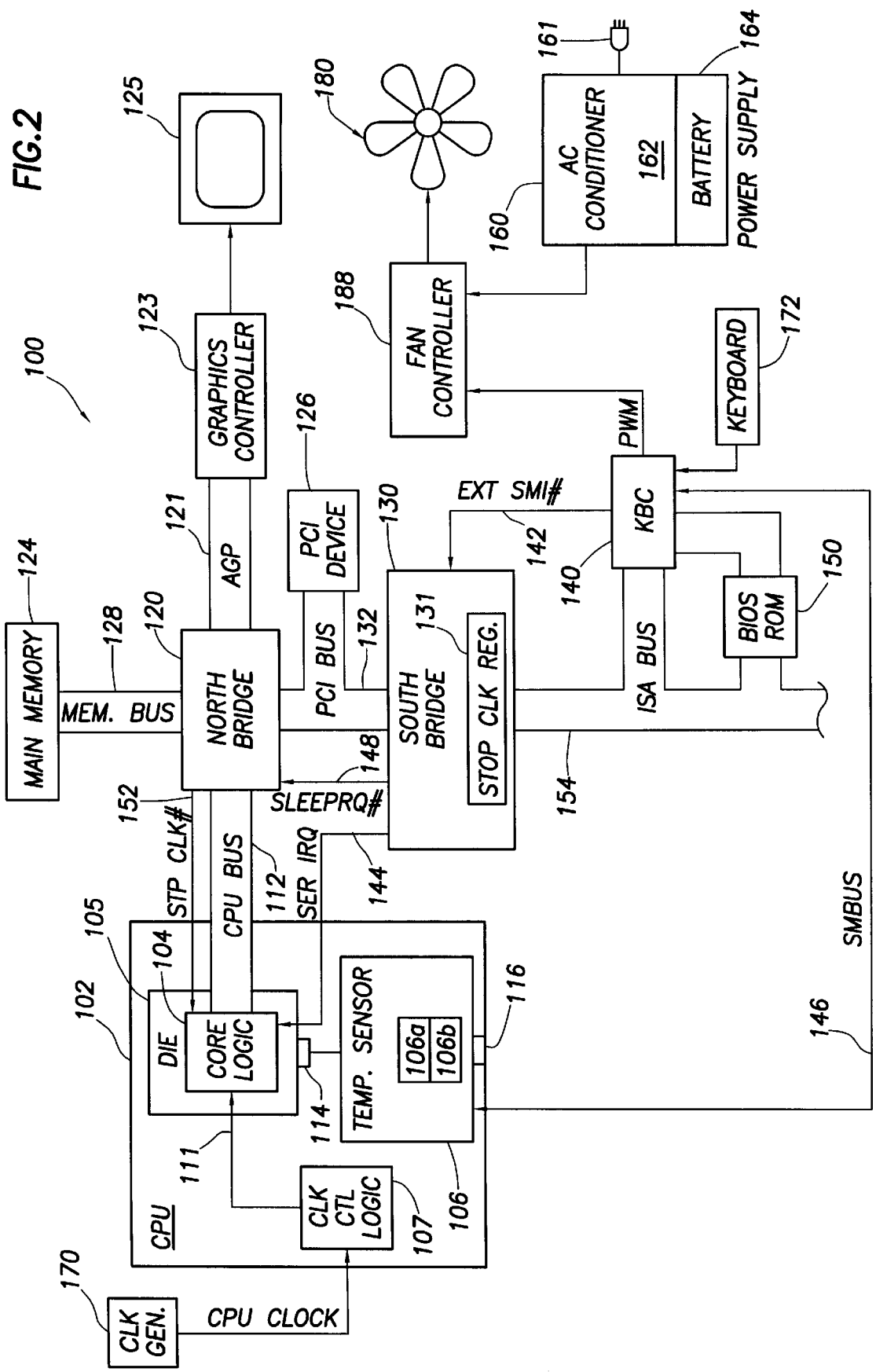
FIG. 2 shows a more detailed block diagram of the computer system of FIG. 1.

Numerous embodiments exist to implement the thermal control logic 108 of FIG. 1. Referring now to FIG. 2, one exemplary embodiment of computer system 100 includes a CPU 102, bus bridge devices 120 and 130, main memory 124, a keyboard controller 140, a power supply 160, and a fan 180. As shown, computer system 100 also includes a graphics controller 123, a display 125, a BasicInput/Output System Only Memory ("BIOS ROM"), a keyboard 172, and a fan controller 188. One of ordinary skill in the art will recognize that computer system 100 may include other components such as disk drives, a pointing device, etc.

In accordance with the preferred embodiment of FIG. 2, the thermal control logic 108 of FIG. 1 is implemented using as much hardware as possible that already is present in the computer system. For example, some of the functions performed by the thermal control logic 108 are performed by keyboard controller 140 as described below. If desired, however, additional hardware can be added to the computer system diagram of FIG. 2 specifically to provide the thermal control functions of thermal control logic 108.

As shown in FIG. 2, CPU 102 couples to bridge device 120 via a CPU bus 112. Bridge device 120 is called a "North" bridge because of its location in the drawing relative to bridge device 130 (the "South" bridge). Clock generator generates and provides a CPU CLOCK signal to the clock control logic 107 of CPU 102.

The main memory array 124 preferably couples to the North bridge 120 through a memory bus 128, and the North bridge 120 preferably includes a memory control unit (not shown) that controls transactions to the main memory 124 by asserting various control signals during memory accesses. The main memory 124 functions as the working memory for the CPU 102 and the rest of the computer system 100 and generally includes a conventional memory device or array of memory devices in which application programs and data are stored. The main memory array 124 may comprise any suitable type of memory such as dynamic random access memory ("DRAM") or any of the various types of DRAM devices such as synchronous dynamic random access memory ("SDRAM") or extended data out dynamic random access memory ("EDO DRAM").

The computer system 100 also preferably includes a graphics controller 123 that couples to the North bridge 120 via an Advanced Graphics Port ("AGP") bus 121. As one skilled in the art will understand, the graphics controller 123 controls the rendering of text and images on the display device 125. The graphics controller 123 may embody a typical graphics accelerator generally known in the art to render three-dimensional data structures on display 125. These data structures can be effectively shifted into and out of main memory 124 via the expansion bus and North bridge 120. The graphics controller 123 therefore may be a master of the AGP bus enabling the graphics controller 123 to request and receive access to a target interface within the North bridge 120, including the memory control unit. This mastership capability permits the graphics controller 123 to access main memory 124 without the assistance of the CPU 102. A dedicated graphics bus 121 accommodates rapid retrieval of data from main memory 124. Alternatively, the graphics controller 123 may connect to the PCI bus 132 (explained below) and thus AGP bus 121 may not be needed.

The display 125 comprises any suitable electronic display device upon which an image or text can be represented. A suitable display device may include, for example, a cathode ray tube ("CRT"), a liquid crystal display ("LCD"), a thin film transistor ("TFT"), a virtual retinal display ("VRD"), or any other type of suitable display device for a computer system.

The North bridge 120 couples to the South bridge 130 via a suitable peripheral bus 132 (sometimes referred to as a "system" bus). Preferably, bus 132 is a peripheral component interconnect ("PCI") bus. The present invention, however, is not limited to any particular type of expansion bus, and thus various busses may be used including a high speed (66 MHz or faster) PCI bus. In the preferred embodiment, a plurality of PCI peripheral devices reside on the PCI bus 126. The PCI devices may include any of a variety of peripheral devices such as, for example, network interface cards (NIC's), video accelerators, audio cards, hard or floppy disk drives, PCMCIA drives, Small Computer Systems Interface ("SCSI") adapters and telephony cards. Although only one PCI peripheral device 126 is depicted in FIG. 2, it should be recognized that computer system 100 may include any number of PCI devices as desired.

The South bridge couples or "bridges" the primary expansion bus 132 to other secondary expansion busses, such as secondary expansion bus 154. These other secondary expansion busses may include an Industry Standard Architecture ("ISA") bus as shown, or a sub-ISA bus, a Universal Serial Bus ("USB"), an IDE bus, an IEEE 1394 standard (or "fire wire") bus, or any of a variety of other busses that are available or may become available in the future. As will be apparent to one skilled in this art, various peripheral devices may be coupled to ISA bus 154. Thus, as shown in the preferred embodiment of FIG. 2, a keyboard controller (KBC) and the BIOS ROM 150 connect to the ISA bus. As one skilled in the art will understand various IDE devices, such as CD ROM drives, floppy drives, tape drives, and the like, also may connect to ISA bus 154.

The BIOS ROM 150 contains firmware embedded on a ROM memory chip and performs a number of low-level functions. For example, the BIOS executes the power on self test ("POST") during system initialization ("boot up"). The POST routines test various subsystems in the computer system, isolate faults and report problems to the user. The BIOS also is responsible for loading the operating system into the computer's main system memory. Further, the BIOS handles the low-level input/output transactions to the various peripheral devices such as the hard disk drive and floppy drives.

The keyboard controller 140 couples to the CPU 102 via the System Management Bus (SMBus) 146, South Bridge 130, BIOS ROM 150, keyboard 172, fan controller 188, and, if desired, other components not shown. The keyboard controller 140 performs a number of functions besides receiving and processing input from the keyboard 172. In accordance with the preferred embodiment as explained further below, the keyboard controller 140 monitors the temperatures of the CPU 102 and initiates an appropriate response if one or both of the CPU's temperatures exceeds predetermined thresholds.

The keyboard controller 140 controls the speed of the fan preferably through a pulse width modulated (PWM) signal as will be understood by one of ordinary skill in the art. The keyboard controller 140 generates and provides the PWM control signal to the fan controller 188 which, in turn generates and provides a voltage to the fan 180 to establish the fan's speed in accordance with the PWM. The fan controller 188 may be a device separate from the fan 180 or be incorporated within the fan assembly itself.

The power supply 160 includes an alternating current ("AC") conditioning circuit 162 that receives an AC voltage via plug 161 and converts that AC voltage to one or more suitable DC voltages to provide power to the various components of computer system 100. Although only a single power feed is shown to the fan controller 188, the power supply provides power to many other components in the computer system via connections not shown. In accordance with the preferred embodiment of the invention being implemented in a laptop computer, power supply 160 also includes a battery pack 164. Preferably, battery pack 164 is rechargeable. The fan controller 188 preferably converts the input power from the power supply 160 to an appropriate level to establish a fan speed in accordance with the state of the PWM control signal from the keyboard controller 140.

Referring still to FIG. 2, temperature sensor 106 in CPU 102 includes a pair of registers 106a and 106b. If desired, temperature sensor 106 may have other data and programmable configuration and control registers not shown. Preferably, registers 106a, 106b are 8-bit registers. Register 106a preferably stores the current temperature of the CPU core logic 104 or CPU die 105 as detected by temperature response element 114. Register 106b preferably stores the current temperature of the temperature sensor itself as detected by temperature response element 116. The temperature sensor 106 measures the voltage across each silicon diode in response to a known current, converts the voltages, which are, to some degree, a function of temperature, to temperature values rounded to the nearest integer, and stores the temperature values in the appropriate register 106a, 106b. Preferably, the temperature values are integer values in units of degrees centigrade (° C.) and stored in the registers as 8-bit, two's complement values ranging from +127° C. to −128° C. Further, the registers 106a, 106b are "saturating" which means that temperatures above +127° C. are represented as +127° C. and temperatures below −128° C. are represented as −128° C. Table I below shows the encoding of a number of exemplary temperatures. The "B" indicates the associated value is a binary value.

TABLE I

Thermal Sensor Temperature Encoding.

| Temperature (° C.) | Rounded Value | Register Contents | |
|---|---|---|---|
| +130.00 | +127 | 0111 | 1111B |
| +127.00 | +127 | 0111 | 1111B |
| +126.50 | +127 | 0111 | 1111B |
| +126.00 | +126 | 0111 | 1110B |
| +25.25 | +25 | 0001 | 1001B |
| +0.50 | +1 | 0000 | 0001B |
| +0.25 | 0 | 0000 | 0000B |
| 0 | 0 | 0000 | 0000B |
| −0.25 | 0 | 0000 | 0000B |
| −0.50 | 0 | 0000 | 0000B |
| −0.75 | −1 | 1111 | 1111B |
| −1.00 | −1 | 1111 | 1111B |
| −25.00 | −25 | 1110 | 0111B |
| −25.50 | −25 | 1110 | 0111B |
| −54.75 | −55 | 1100 | 1001B |
| −55.00 | −55 | 1100 | 1001B |
| −65.00 | −65 | 1011 | 1111B |

The keyboard controller 140 preferably accesses the current CPU temperatures from registers 106a, 106b by polling the registers via SMBus 146. As one of ordinary skill in the art will understand, the SMBus 146 is a two-wire interface through which simple system and power management related devices can communicate with the rest of the computer system. Other bus structures exist, such as Inter Integrated Circuit ("I²C"), which can be used in place of the SMBus. A device connected to the SMBus can provide for example, manufacture and model and part number information, save its operational state for a suspend event, report different types of errors, accept control parameters, return its status and the like.

Referring still to FIG. 2, the keyboard controller 140 preferably issues a request for temperature data over the SMBus 146 to the temperature sensor 106 of CPU 102. In response, the temperature sensor 106 retrieves the requested temperature data from its temperature data registers 106a, 106b and provides that data to keyboard controller 140. This transaction is in accordance with the SMBus standard protocol known to those of ordinary skill in the art. FIG. 3 shows an exemplary cycle for making the temperature data request and providing the requested data. During this cycles the keyboard controller 140 acts as the "master" of the SMBus meaning the keyboard controller initiates the cycle. The temperature sensor 106 is the "slave" meaning it must respond to the keyboard controller master.

In the exemplary cycle of FIG. 3, the keyboard controller 140 begins the request for temperature data by providing a "start" bit ("S") 302 on the SMBus 146 to signal to devices connected to SMBus 146 that the keyboard controller is about to start a cycle. Following the start bit 302, the keyboard controller 140 places the address 304 of the target device of the cycle, in this case the temperature sensor 106, on the bus. In accordance with the preferred embodiment, the address of the temperature sensor 106 is the seven-bit address 1001101B, although any address is possible that uniquely identifies the temperature sensor 106. Following the seven bit address 304, the keyboard controller 140 provides a "write" bit 306 to indicate it will subsequently provide a command 310 to the temperature sensor 106. According to the SMBus standard, an acknowledge bit follows every eight-bit message. Thus, acknowledge bits 308, 312, and 320 follow their respective eight-bit messages.

The keyboard controller 140 then provides an eight-bit command value 310 to direct the temperature sensor 106 to provide the requested current temperature values from register 106a or 106b to the keyboard controller. Preferably, the command byte 310 is either 0000 0000B or 0000 0001B (00 or 01 hexadecimal). Command byte 0000 0000B directs the temperature sensor 106 to provide the current CPU die temperature from register 106a to the keyboard controller 140. Command byte 0000 0001B directs the temperature sensor 106 to provide the current temperature sensor temperature from register 106b to the keyboard controller 140.

The keyboard controller 140 then asserts another start bit 314 followed by the temperature sensor's seven-bit address 316 and a "read" bit 318 to direct the temperature to begin transmitting the requested data back over the SMBus 146 to the keyboard controller. The temperature sensor 106 provides the requested data in data frame 322. The "///" represents a negative acknowledge bit asserted by the keyboard controller 140 to indicate receipt of the requested temperature data from the CPU 102. Finally, the keyboard controller terminates the data cycle by issuing a "stop" bit ("P") 326.

The keyboard controller 140 preferably uses the communication protocol described above to "poll" (i.e., request data from) the temperature sensor 106 in the CPU 102 at a predetermined or programmable rate. Preferably, the keyboard controller 140 polls the temperature sensor 106 at a rate of approximately once per second, although higher or lower polling rates can be used if desired.

In accordance with the preferred embodiment, keyboard controller 140 polls the temperature sensor 106 and determines whether each temperature, the CPU die temperature and the temperature sensor temperature, has exceeded a predetermined threshold. The predetermined thresholds are provided in a pair of thermal control tables included as part of the BIOS code stored in BIOS ROM 150. FIGS. 4 and 5 show an exemplary pair of control tables 209 and 213. The thermal control table 209 of FIG. 4 is used to control fan speed and the table 213 of FIG. 5 is used to control CPU speed (i.e., throttling).

Referring first to the fan speed control table 209 of FIG. 4, the table preferably includes four rows 201, although the number of rows can be varied as desired. Each row 201 includes a low temperature threshold value and a high temperature threshold value that define a temperature range that specifies a desired fan speed associated with each temperature range. The temperature associated with each fan speed setting preferably is the temperature of the temperature sensor thermal response element 116, or any other temperature response element that preferably is not substantially affected by heat generated by the CPU core 104. The fan speed value preferably is a value in the range of 0 to F hexadecimal (0 to 15 decimal). The fan speed value represents a relative value which specifies a particular fan speed for an associated temperature value. For example, a fan speed of 0 represents a fan speed of 0 revolutions per minute (i.e., off) and is associated with a temperature response element temperature between 0 and 65° C. A fan speed of Fh (15 decimal) represents the maximum preferred fan speed and is associated with a temperature response element temperature of 76–100° C. Values from 1 to Eh (14 decimal) represent relative fan speeds between off (0) and maximum speed (15). The maximum fan speed will vary from one computer configuration to the next and also will vary depending on the size of the fan selected (e.g. smaller fans must spin faster than larger fans to move the same volume of air). The maximum fan speed will also depend on the volume of air needed to be moved. One of ordinary skill in the art will be able to determine a suitable fan speed given these considerations. A fan speed of $8/15$ of full speed is preferred when the temperature of temperature response element 116 is in the range of 60 to 70° C. The relative fan speed $12/15$ (C) is preferred when the temperature of temperature response element 116 is in the range of 66 to 80° C. Thus, the speed of fan 180 preferably is increased as the temperature of temperature response element 116 increases, and the relationship between the preferred fan speed and the temperature of temperature response element 116 is specified by control table 209. Each of the four fan speeds shown in control table 209 has an associated temperature range that defines a range of temperature response element 116 temperatures for which that fan speed is preferred.

Referring now to the CPU throttle control table 213 of FIG. 5, each row 211 includes low and high temperature threshold values that define temperature ranges each of which specify a preferred setting for CPU throttling. Preferably, each of the temperature ranges in control table 213 pertain to the temperature of the CPU core 104 or die 105 as detected by temperature-response element 114. Each temperature range thus includes an associated CPU throttle setting, preferably expressed as a percentage of full CPU speed. Thus, the CPU core is throttled to its maximum preferred speed (100%) when an associated temperature is in the range of 0 to 90° C. The CPU core is throttled down to 75% of full speed when the associated temperature is between 80 and 95° C. When the temperature is between 80 and 99° C., the CPU speed is throttled down to 50% of full speed. When the temperature is between 96 and 100° C., the CPU is placed in standby (STDBY) mode in which the CPU clock is turned off completely (0°). Thus, the CPU throttling speed is decreased as the CPU core, or CPU die, temperature increases, and the relationship between the preferred CPU throttling setting and the temperature of temperature response element 114 is specified by control table 213. Each of the four CPU throttle settings in control table 213 has an associated temperature range that defines a range of temperature response element 114 temperatures for which that CPU throttle setting is preferred. Using control tables 209, 213, fan speed and CPU throttling are controlled independently and depend on a different temperature reading. This independence permits the fan and CPU speed to be adjusted in a more efficient manner than previously possible.

By way of illustration, the fan is off (speed=0) and the CPU operates at 100% of its maximum speed until the temperature of temperature response element 116 exceeds 65° C. (FIG. 4). At that point, per control table 209, the fan 180 turns on to a relative speed of 8/15 (i.e., a little more than one-half of the fan's maximum preferred. The CPU core, however, continues operating at fall speed (100%) as CPU throttling is unaffected by increases in the temperature of temperature response element 116. If, however, the CPU die temperature exceeds 90° C. (FIG. 5), the CPU core 104 is throttled back to 75% without affecting fan speed. By specifying the control parameters for fan speed and CPU throttling independently, the computer system 100 can control fan speed and CPU throttling individually.

The temperature range of each range in tables 209, 213 preferably overlaps to a certain extent with adjacent rows in the tables of FIGS. 4–5. For example, 60 to 65° C. is part of both the first and second rows of the fan speed control table 209 in FIG. 4. Partially overlapping the temperature ranges provides "hysteresis" which generally refers to the dependence of the state of a system on its previous history or state. Referring still to FIG. 4, for example, at a temperature response element temperature of 25° C., the fan 180 will be off. When the temperature response element 116 temperature exceeds 65° C., the computer system responds by turning on the fan 180 to speed of 8/15 of full speed. With the change in fan speed to 8/15, the computer system will then use the temperature range of the second row in table 209 (60 to 70° C.) as the current temperature control range. This means that as the temperature of response element 116 then decreases in response to the cooling affect provided by fan 180, the computer system will not turn off the fan 180 until the temperature drops below 60° C. which is the low temperature in the current temperature range. Thus, the fan turns on at a temperature greater than 65° C., but turns off only when the temperature drops below 60° C. This hysteresis effect prevents the fan from rapidly oscillating between two speeds (e.g., 0 and 8) if the temperature waivers around a threshold value.

During POST, the CPU core 104, under control of the BIOS code, copies the control tables of FIGS. 4 and 5 to main memory 124. Also during POST, the keyboard controller 140 reads the CPU temperature registers 106a, 106b to ascertain the current temperatures of the CPU die 105 and temperature sensor 106 temperature. The keyboard controller 140 then provides the current temperature values to the CPU core 104 by way of ISA and PCI bus commands via the South and North bridges 130, 120. The CPU core 104 accesses main memory 124 and uses the current CPU temperatures to retrieve the low and high temperature ranges from each of the control tables associated with the current temperature.

For example, if the current die and temperature sensor temperatures are 70° C. and 40° C., respectively, the CPU core 104 will retrieve the temperature range of 0 to 75° C. from the table 209 as the temperature range for controlling fan speed. Further, the CPU core 104 will retrieve 0 to 90° C. from table 213 as the temperature range for controlling CPU core throttling. If a current temperature value happens to fall in two temperature ranges in a control table, the CPU core 104 preferably selects the lower range. Thus, if the CPU die temperature is 85° C., the CPU core 104 preferably selects the lower temperature range values of 0° C. and 90° C., rather than 80° C. to 95° C. With the temperature range values from tables 209 and 213 associated with the temperatures of temperature response elements 114, 116, the CPU core 104 writes those values to registers (not shown) in the keyboard controller 140. The keyboard controller 140 preferably uses those temperature range values to determine when one of the CPU's temperatures has exceeded its associated temperature range.

Figure 7:
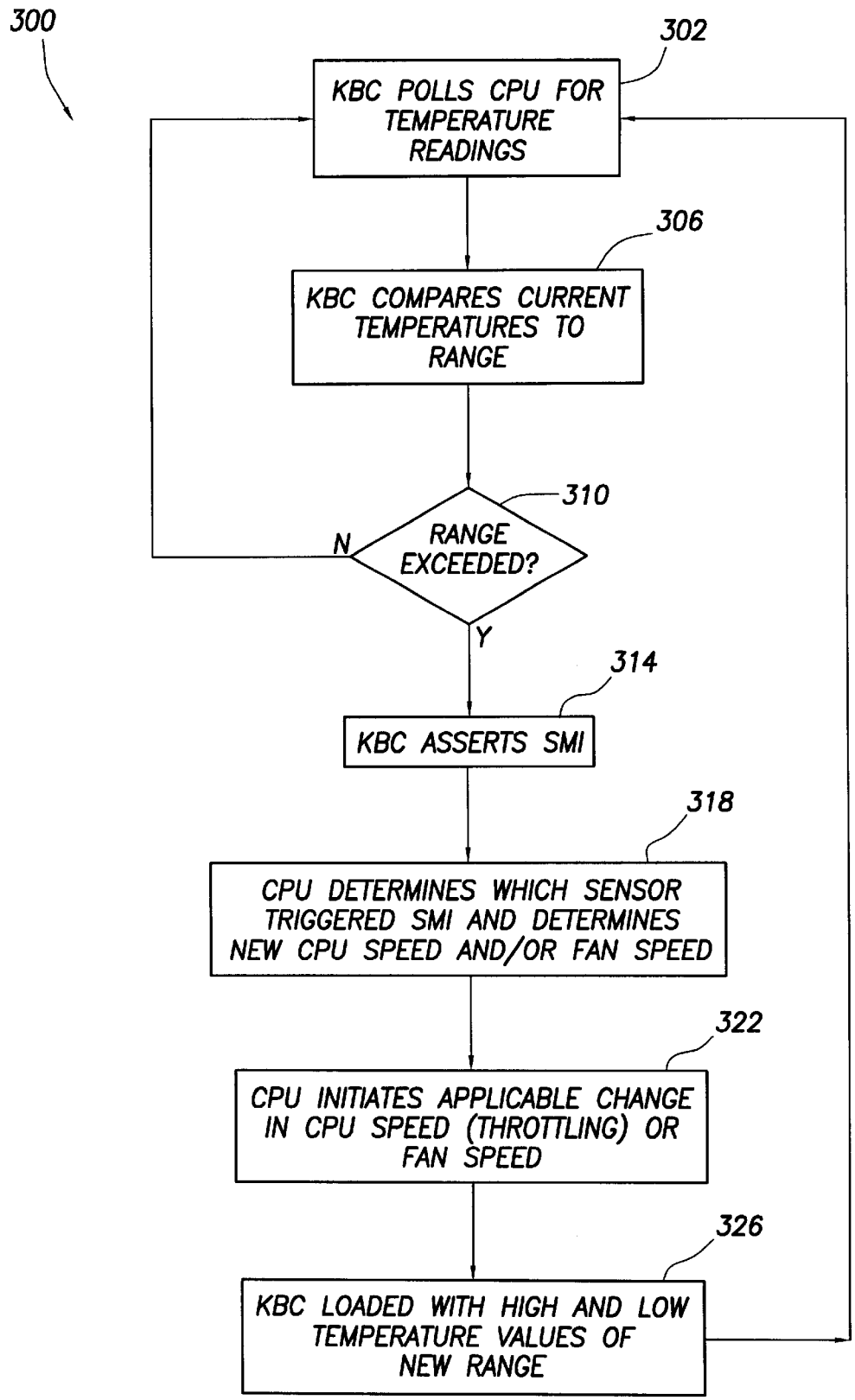
FIG. 7 shows a preferred method for independently controlling the passive and cooling mechanisms in the computer system of FIG. 2 by monitoring the microprocessor's internal and external temperatures.

Referring now to FIGS. 2 and 7, a preferred method 300 shown in FIG. 7 for adjusting fan speed and CPU throttling using the circuit of FIG. 2 will now be described. As noted above, the keyboard controller 140 regularly polls the temperature sensor 106 as indicated by step 302. The keyboard controller 140 preferably performs this step by interacting with the temperature sensor 106 over SMBus 146 using the preferred protocol of FIG. 3 to obtain the current temperatures of temperature response elements 114 and 116.

In step 306, the keyboard controller 140 compares the current temperature values read from the CPU temperature sensor 106 to the current temperature ranges stored in internal memory (not shown). If the current CPU temperatures are within their associated temperature ranges, as determined in decision step 310, control loops back to step 302 and the keyboard controller again polls the CPU's temperature sensor 106 for its updated temperature values.

If, however, one or both of the CPU temperatures exceeds an associated range, either falling below the lower temperature threshold value or rising above the upper temperature threshold value, the keyboard controller 140 asserts its EXTernal System Management Interrupt ("EXT SMI#"; the "#" symbol indicates the signal is active low) signal 142 (FIG. 2) which preferably is provided to the South bridge 130. The South bridge 130 responds to the asserted EXT SMI signal by asserting a SMI over the SERial Interrupt Request ("SER IRQ") chain 148 to the CPU 102. The SER IRQ signal generally comprises a serial bit stream of interrupt information that includes a SMI from the assertion of the EXT SMI# signal.

In step 318, the CPU core 104 responds to the indication in the SER IRQ bit stream that the keyboard controller 140 has asserted its EXT SMI# signal by determining which of its temperatures, CPU die temperature or temperature sensor 106 temperature, caused the keyboard controller 140 to trigger the SMI. The CPU core 104 performs this step by communicating with the keyboard controller 140 using a "mailbox" communication scheme as would be known to those of ordinary skilled in the art. Generally, the keyboard controller 140 writes information indicative of which temperature response element 114, 116 exceeded its associated temperature range and indicative of the current temperature detected by that response element into a memory buffer. That memory buffer may be part of main memory 124. The CPU core 104 then retrieves this temperature information from that "mailbox" buffer to ascertain which temperature response element triggered the SMI and the value of its current temperature.

Also in step 318, once the CPU core 104 determines which temperature response element 114, 116 triggered the thermal event, the CPU core 104 determines whether and how to alter the fan speed and/or the CPU core throttling to correct the problem. The CPU core 104 compares the current temperature of the temperature response element 114, 116 that triggered the thermal event to the control tables 209, 213 that are stored in main memory 124. Preferably, the CPU core 104 begins its comparison with the lowest temperature range of the control table associated with the temperature response element that triggered the thermal event and determines whether the current temperature of the associated temperature response element value falls with that range. If the temperature response element triggering was response element 116, the CPU core 104 preferably examines the fan speed control table 209 of FIG. 4. If, however, the triggering temperature response element was response element 114, the CPU core 104 examines the CPU throttling control table 213 of FIG. 5. If the current temperature value is greater than the high temperature value of the associated temperature range, the CPU core 104 then looks to the next higher temperature range in the same control table to determine whether the next range includes the current temperature. By comparing the current temperature to the various temperature ranges in the associated control table, the CPU core 104 determines the desired setting for fan speed or CPU throttling.

By way of example, assume the current temperature of the CPU die 105 is 75° C. and the temperature of the temperature sensor 106 is 60° C. With these temperatures the fan 180 will be off (fan speed 0) and the CPU core 104 would be throttled to its maximum setting (100%). If the CPU core 104 heats up, the keyboard controller 140 will trigger an EXT SMI# when the CPU die 105 temperature exceeds 90° C. That is, when the CPU die temperature reaches 91° C., the keyboard controller 140 detects this thermal event and generates the EXT SMI# signal 142. Once this happens, the CPU core 104 determines that temperature response element 114 caused the keyboard controller 140 to trigger the EXT SMI#. The CPU core 104 receives the current temperature of temperature response element 114 from the keyboard controller and compares the current temperature of temperature response element 114 to the temperature ranges of the CPU throttling control table 213 of FIG. 5. The CPU core 104 compares the current temperature of the CPU die (91° C.) to the first temperature range of control table 213 (i.e., 0–90° C.). Determining that the CPU die temperature exceeds that temperature range, the CPU core 104 then examines the second range (80–95° C.) and determines that the current die temperature (91° C.) is within this range. The CPU core then reads the value of the preferred CPU speed of 75% from the table 213 and, as explained below, initiates a change in CPU clock frequency to 75% of its maximum preferred frequency. Throttling down the CPU core 104 to 75% of fall speed will result in a decrease in die temperature. Once the die temperature drops below 80° C., as determined by the keyboard controller 140, another EXT SMI# event is triggered to permit the CPU table throttled back up to 100% for maximum performance.

In step 322, the CPU core 104 initiates the change to either the CPU throttling or fan speed. To change the CPU throttling, the CPU core writes a value indicative of the preferred CPU speed through the North bridge 120 to the Stop Clock Register 131 in the South bridge. The Stop Clock Register 131 preferably is an eight-bit register that controls the assertion and modulation of the SLEEPRQ# signal 148 to the North bridge 120. "Modulating" the SLEEPRQ# signal 148 refers to controlling the amount of time the signal is active (i.e., asserted) relative to the amount of time the signal is inactive (deasserted). A modulation level of 50% means the signal is deasserted for one-half of each of its cycles and asserted during the other half. A 90% modulation level means the signal is on 90% of each cycle and off for 10%. The SLEEPRQ# directs the North bridge 120 to assert the STPCLK# signal 152 to the CPU 102 which causes the CPU's internal clock signal to be shut off. Thus, by modulating the SLEEPRQ# signal, and thus the STPCLK# signal, the South bridge 130 can set the CPU throttling to a level specified by the CPU core via the Stop Clock register 131.

The Stop Clock Register 131 preferably includes four bits, e.g., bits 3–0, that define the modulation of the SLEEPRQ# signal 148. Setting these modulation control bits to 0000B, for example, keeps SLEEPRQ# deasserted (no modulation) and thus the CPU core 104 will run at fill speed. Setting the modulation control bits to 1111B, on the other hand, keeps SLEEPRQ# asserted throttling the CPU core to 0 speed effectively shutting of the CPU. Values of the modulation control bits from 0001 to 1110b define a fractional level of modulation for SLEEPRQ# according to the relation n/15 where n represents the value of the modulation control bits. Thus, a value of 0101B (5 decimal) defines a modulation level of 5/15 or 33.33% of full CPU speed.

To change the fan speed, the CPU core 104 writes a preferred fan speed setting to the keyboard controller 140, via the North and South bridges 120, 130. The keyboard controller 140 responds by generating an appropriate PWM signal to the fan controller 188. The modulation of the PWM signal is proportional to the desired fan speed. Little modulation results in a faster fan speed. Increasing the level of modulation of the PWM signal causes the fan 180 to turn at a slower speed. Preferably, the fan controller 188 uses the PWM signal from the keyboard controller 140 to cause a corresponding DC voltage level to be provided to the fan 180 from the power supply 160. Thus, the fan controller 188 reduces the voltage of the power feed from power supply 160 to a level in accordance with the PWM signal.

The preferred embodiment of the invention can be implemented in any electronic system, such as a desktop computer system, that includes an electronic device, such as a CPU, that becomes warm or hot during use and that has the capability to monitor its internal and external temperature. The preferred embodiment of the invention is particularly useful, however, in portable or laptop computer systems that can operate off battery power. When operating from a battery source, a portable computer should be designed to use as little power as possible thereby permitting the computer to operate for longer periods of time. Because a laptop computer's fan requires electrical power to turn, it is generally desirable to leave the fan off as much as possible or to run the fan as slow as possible. Of course, the fan may be, and often is, necessary to keep the computer system sufficiently cool. An alternative embodiment of the invention balances the need for maintaining a relatively cool thermal environment against the desirability to minimize the power drain on the battery.

In accordance with the alternative embodiment, the computer system responds to a thermal event caused by either of the CPU temperatures exceeding the associated temperature range by throttling down the CPU core 104 before turning on the fan 180. That is, the CPU core 104 first tries to correct the thermal problem by slowing down the CPU clock frequency so that the CPU core 104 becomes cooler. If, however, that response proves insufficient to correct the thermal problem, the CPU core 104 then will turn on the fan or increase the fan's speed, if the fan is already on, to further attempt to cool the computer. Although numerous techniques for implementing this alternative embodiment are possible and within the scope of the present invention, the following implementation is preferred.

Referring now to FIGS. 2 and 4–6, the alternative embodiment of the invention includes the use of two pairs of thermal control tables, rather than one as described previously. One pair, such as the pair 209, 213 shown in FIGS. 4 and 5, is used when the computer system 100 is operating from AC power via plug 161. Another pair, such as the tables 209, 213 shown in FIGS. 4 and 6, preferably is used when the computer system operates using power provided by battery 164. Power management preferably is performed by the South bridge 130 in accordance with known techniques. Thus, the computer system 100 generally, and keyboard controller 130 specifically, determines when power is being supplied from plug 161 or battery 164. Using this information, the CPU core 104 programs the keyboard controller 140 to use information from control tables 209, 213 when operating from AC power and from control tables 209, 217 when operating from battery 164.

The thermal control tables of FIGS. 5 and 6 both provide parameters for controlling CPU throttling. The difference between the tables is the temperature range limits. The temperature ranges of control table 217 generally include lower values for each of the temperature ranges. For example, the lowest temperature range in table 217 of FIG. 6 is 0 to 65° C., while the comparable lowest range in table 213 is 0 to 90° C. Thus, the thermal control table 217 of FIG. 6 will cause the CPU core 104 to throttle itself down at lower CPU core temperatures.

By setting the threshold values at a relatively low level in the control table 217 of FIG. 6, the CPU core 104 usually will respond to a temperature event by throttling down the CPU before turning on the fan 180. This alternative embodiment reacts to a temperature event by slowing down the processor in an attempt to correct the problem while using as little power as possible. Thus, the fan 180 preferably is turned on only if CPU throttling proves ineffective.

The above discussion is meant to be illustrative of the principles of the present invention. Numerous variations and modifications will become apparent to those skilled in the art once the above disclosure is fully appreciated. For example, the embodiments described above can also be implemented in software if desired. It is intended that the following claims be interpreted to embrace all such variations and modifications.

What is claimed is:

1. A computer system, comprising:
   a CPU, wherein said CPU further comprises:
     a CPU core;
     clock control logic coupled to said CPU core and providing a periodic clock signal to said CPU core;
     at least two temperature response elements within said CPU;
     wherein a first temperature response element is adjacent to said CPU core;
     a temperature sensor coupled to said first temperature response element, said temperature sensor including a second temperature response element, and said temperature sensor capable of monitoring the temperature of said first and second temperature response elements; and
   thermal control logic coupled to said temperature sensor and said clock control logic;
   a fan coupled to said thermal control logic;
   wherein said temperature sensor provides a value indicative of the temperature of said first and second temperature response elements to said thermal control logic and said thermal control logic independently controls the frequency of the clock signal provided to said CPU core and the speed of said fan based on the temperatures of the first and second temperature response elements.

2. The computer system of claim 1 wherein said CPU core, clock control logic, first and second temperature response elements, and said temperature sensor are included in a single monolithic package.

3. The computer system of claim 1 wherein said temperature sensor includes at least one temperature register in which temperature values indicative of the first and second temperature response elements are stored.

4. The computer system of claim 3 wherein said thermal control logic includes a controller that reads the temperature values from the temperature register.

5. The computer system of claim 4 wherein said computer system also includes a keyboard and said controller is a keyboard controller coupled to said keyboard and receives signals from said keyboard.

6. The computer system of claim 4 further including a fan controller coupled between said controller and said fan and said controller provides a signal to the fan controller indicative of the desired speed of the fan.

7. The computer system of claim 6 wherein the signal indicative of the desired fan speed is a pulse width modulated signal.

8. The computer system of claim 6 wherein said CPU core provides temperature threshold values to said controller, said temperature threshold values define at least one temperature range.

9. The computer system of claim 8 further including main memory coupled to the CPU core in which first and second temperature control tables are stored, each of said tables defining an operating characteristic of the computer system as a function of temperature.

10. A computer system, comprising:
    a CPU core;
    clock control logic coupled to said CPU and providing a periodic clock signal to said CPU;
    a first temperature response element adjacent to said CPU core;
    a temperature sensor coupled to said first temperature response element, said temperature sensor including a second temperature response element, and said temperature sensor capable of monitoring the temperature of said first and second temperature response elements;
    thermal control logic coupled to said temperature sensor and said clock control logic;
    a fan coupled to said thermal control logic;
    wherein said temperature sensor provides a value indicative of the temperature of said first and second temperature response elements to said thermal control logic and said thermal control logic independently controls the frequency of the clock signal provided to said CPU core and the speed of said fan based on the temperatures of the first and second temperature response elements;
    wherein said temperature sensor includes at least one temperature register in which temperature values indicative of the first and second temperature response elements are stored;
    wherein said thermal control logic includes a controller that reads the temperature values from the temperature register;
    a fan controller coupled between said controller and said fan and said controller provides a signal to the fan controller indicative of the desired speed of the fan;
    wherein said CPU core provides temperature threshold values to said controller, said temperature threshold values define at least one temperature range; and main memory coupled to the CPU core in which first and second temperature control tables are stored, each of said tables defining an operating characteristic of the computer system as a function of temperature;

wherein the first temperature control table specifies the level of CPU throttling in relation to the temperature of the first temperature response element.

11. The computer system of claim 10 wherein the second temperature control table specifies the desired fan speed in relation to the temperature of the second temperature response element.

12. The computer system of claim 6 further including a bridge device coupled between said CPU core and said controller.

13. The computer system of claim 11 wherein said controller also connects to the CPU via a system management bus and reads the current temperatures of each of the first and second temperature response elements from the temperature register.

14. The computer system of claim 13 wherein said controller asserts a first interrupt signal to the bridge device if one of the current temperatures of each of the first and second temperature response elements exceeds its associated temperature range.

15. The computer system of claim 14 wherein the bridge device responds to the asserted first interrupt signal by asserting a second interrupt signal to the CPU core which responds by determining which temperature response element caused the controller to assert the first interrupt signal and by determining the current temperature of the temperature response element that caused the first interrupt to be asserted.

16. The computer system of claim 15 wherein the CPU core compares the current temperature to the first temperature control table if the first temperature response element caused the controller to assert the first interrupt signal.

17. The computer system of claim 15 wherein the CPU core compares the current temperature to the second temperature control table if the second temperature response element caused the controller to assert the first interrupt signal.

18. The computer system of claim 1 wherein the thermal control logic adjusts the frequency of the clock signal before adjusting the speed of said fan.

19. A computer system, comprising:
a CPU core;
clock control logic coupled to said CPU and providing a periodic clock signal to said CPU;
a first temperature response element adjacent to said CPU core;
a temperature sensor coupled to said first temperature response element, said temperature sensor including a second temperature response element, and said temperature sensor capable of monitoring the temperature of said first and second temperature response elements;
thermal control logic coupled to said temperature sensor and said clock control logic; and
a fan coupled to said thermal control logic;
wherein said temperature sensor provides a value indicative of the temperature of said first and second temperature response elements to said thermal control logic and said thermal control logic independently controls the frequency of the clock signal provided to said CPU core and the speed of said fan based on the temperatures of the first and second temperature response elements; and wherein said thermal control logic includes hysteresis in controlling the fan speed.

20. A method for controlling the temperature of a computer system, comprising:
(a) monitoring the temperatures at two locations within a CPU;
(b) comparing the temperatures at the two locations to predetermined temperature ranges, each temperature range associated with the temperature at one of said two locations;
(c) independently controlling the speed of a fan or the frequency of a CPU clock signal based on the temperatures at the two locations.

21. The method of claim 20 wherein the locations of step (a) include a CPU die and an area in an outer region of the CPU.

22. The method of claim 21 wherein step (c) includes adjusting the fan speed if the temperature of the area in the outer CPU region exceeds an associated predetermined temperature range.

23. The method of claim 22 wherein step (c) includes adjusting the CPU clock signal frequency if the temperature of the CPU die exceeds an associated predetermined temperature range.

24. The method of claim 21 wherein step (c) includes adjusting the frequency of the CPU clock frequency before adjusting the speed of the fan.

25. The method of claim 20 further including asserting an interrupt signal if the temperature of either location exceeds an associated temperature range.

26. A method for controlling the temperature of a computer system, comprising:
monitoring the temperatures at two locations within a CPU;
comparing the temperatures at the two locations to predetermined temperature ranges, each temperature range associated with the temperature at one of said two locations;
independently controlling the speed of a fan or the frequency of a CPU clock signal based on the temperatures at the two locations;
wherein the two locations include a CPU die and an area in an outer region of the CPU; and
storing first and second control tables in memory, the first control table used to control fan speed as a function of the temperature of the outer region of the CPU and the second control used to control CPU clock signal frequency as a function of the temperature of the CPU die.

27. The method of claim 26 wherein the first control table includes a first plurality of temperature ranges for the outer region of the CPU and a fan speed setting associated with each of the first plurality of temperature ranges.

28. The method of claim 27 further including comparing the current temperature of the outer region to the first plurality of temperature ranges.

29. The method of claim 26 wherein the second control table includes a second plurality of temperature ranges for the CPU die and a setting for CPU clock signal frequency associated with each of the second plurality of temperature ranges.

30. The method of claim 29 further including comparing the current temperature of the CPU die to the second plurality of temperature ranges.

31. A thermal control system for a computer, comprising:
a CPU including:
a CPU core fabricated on a semiconductor die packaged within said CPU;

a temperature sensor located in an exterior region of said CPU;

a first temperature response element thermally coupled to the semiconductor die and coupled to said temperature sensor; and a second temperature response included as part of the temperature sensor;

wherein said temperature sensor monitors the temperatures detected by the first and second temperature response elements and stores temperature values indicative of the detected temperatures in at least one register;

a clock control logic coupled to said CPU core and providing a periodic CPU clock signal to said CPU core, the frequency of the CPU clock signal being adjustable;

a controller coupled to said CPU via a first bus, said CPU provides the temperature values from said at least one register to said controller via said first bus and said controller compares the temperature values to predetermined temperature ranges and generates a first interrupt signal if one of the temperature ranges is exceeded; and a fan coupled to said controller.

32. The thermal control system of claim 31 wherein said controller is a keyboard controller that receives input signals from a keyboard.

33. The thermal control system of claim 31 wherein said first interrupt signal is provided to a first bridge device coupled between said controller and said CPU, and said first bridge device responds to the first interrupt signal by asserting a second interrupt signal to the CPU.

34. The thermal control system of claim 33 further including a second bridge device coupled between the first bridge device and the CPU and also coupled to main memory, and said CPU responds to said second interrupt signal by receiving from the controller via said first and second bridge devices an indication of which of said temperature response elements caused the controller to generate the first interrupt signal and an indication of the current temperature of the temperature response elements that caused the controller to generate the first interrupt signal.

35. The thermal control system of claim 34 wherein first and second control tables are stored in main memory, the first control table specifying fan speed and the second control table specifying CPU clock signal frequency.

36. The thermal control system of claim 35 wherein the first control table includes a plurality of values that specify fan speed, each fan speed value associated with a range of temperatures of the second temperature response element.

37. The thermal control system of claim 35 wherein the second control table includes a plurality of values indicative of CPU clock signal frequency, each CPU clock signal frequency value associated with a range of temperatures of the first temperature response element.

38. The thermal control system of claim 37 wherein said controller is programmed with a range of temperatures from each of the first and second control tables and said controller compares the current temperatures received from the CPU to said range of temperatures programmed in the controller.

39. The thermal control system of claim 31 wherein said controller includes hysteresis to control the speed of said fan.

* * * * *